UNITED STATES PATENT OFFICE.

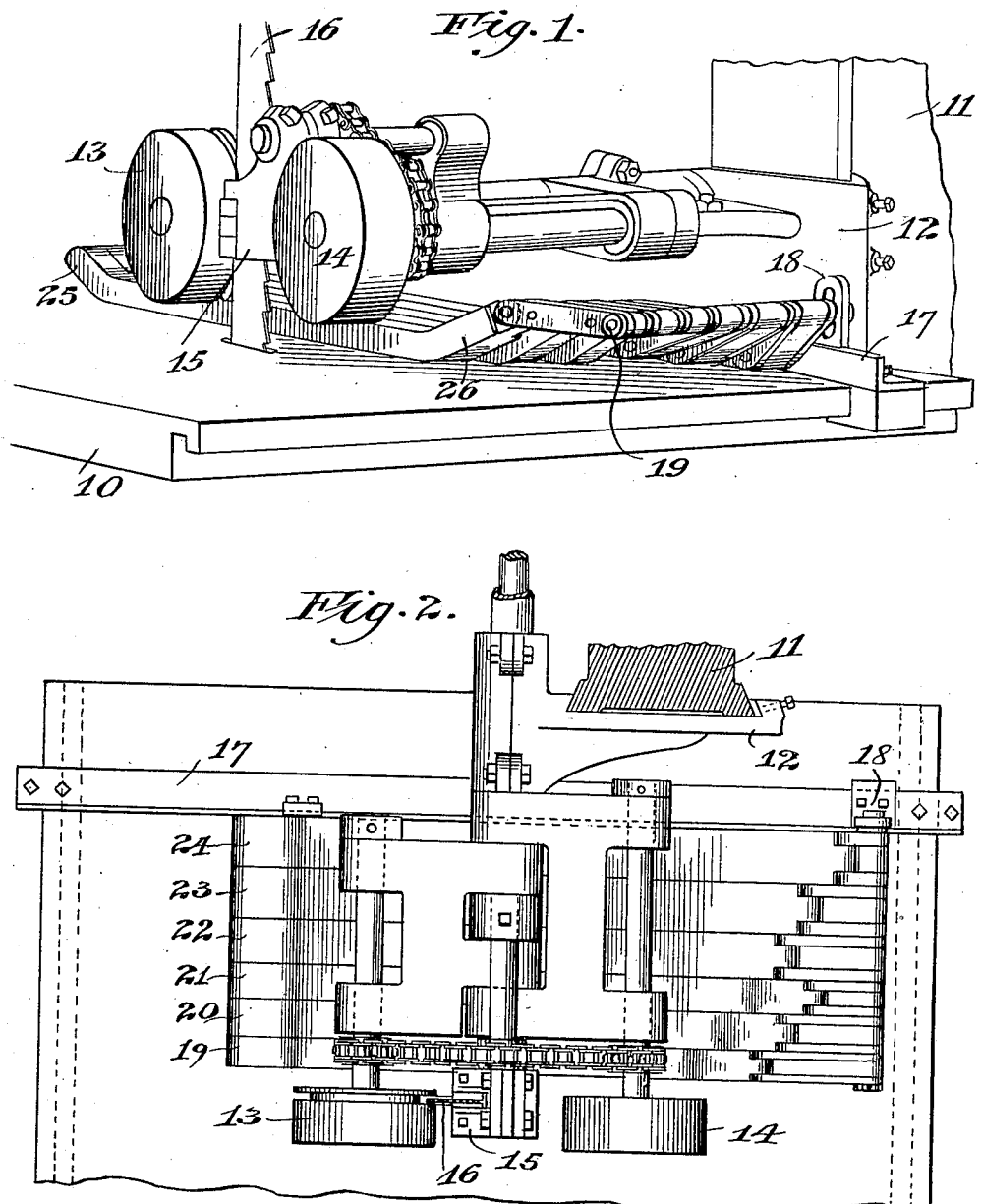

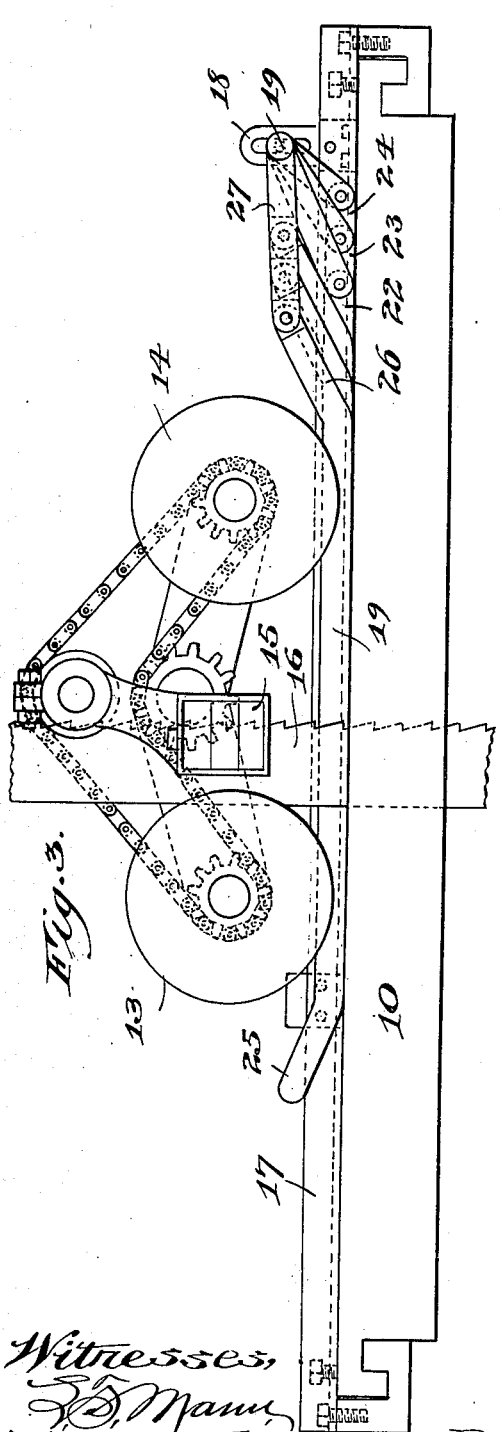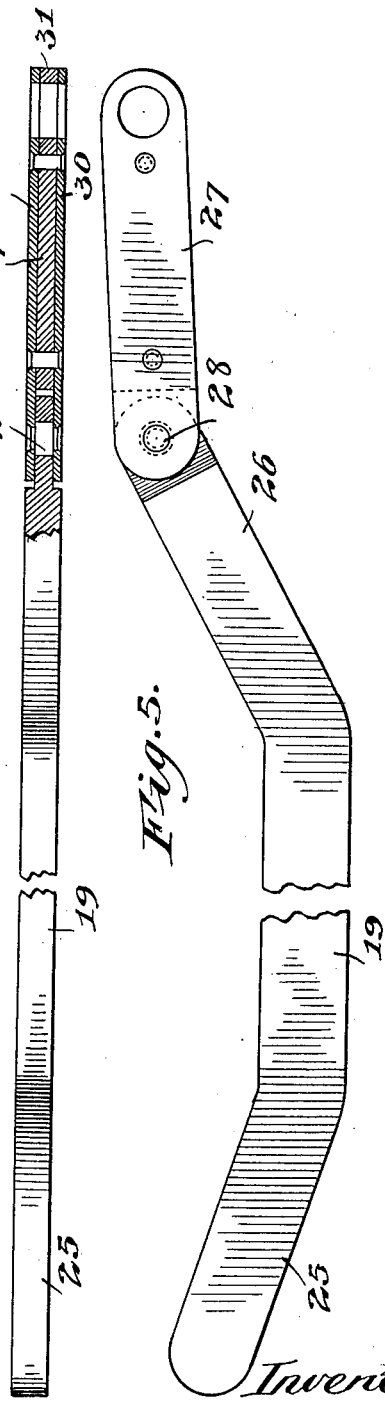

GILBERT O. HAMMER, OF BELOIT, WISCONSIN, ASSIGNOR TO THE BERLIN MACHINE WORKS, OF BELOIT, WISCONSIN, A CORPORATION OF WISCONSIN.

MULTIPLE GAGE.

No. 913,641.  Specification of Letters Patent.  Patented Feb. 23, 1909.

Application filed April 11, 1908. Serial No. 426,544.

*To all whom it may concern:*

Be it known that I, GILBERT O. HAMMER, a citizen of the United States, residing at Beloit, in the county of Rock and State of Wisconsin, have invented certain new and useful Improvements in Multiple Gages, of which the following is a specification.

The improvement of gages or guides for boards fed to a saw or the like is the main aim and object of my present invention. I propose to use a plurality of parallel guide bars spaced apart the correct and desired distance from the saw, any one of which may be used as a gage or guide for a board, the latter passing beneath the other guide bars located between the chosen or selected one and the saw. The board raises these other guide bars out of the way and temporarily renders them inoperative. Each of the gages or guides is hinged, preferably by means of a link, to a support at the forward end of the table of the machine, and the front ends of the guides are arranged in stepped relation, that is, they project successively farther forward, the one most remote from the saw extending forwardly the greatest amount. The purpose of this arrangement is to permit the operator or workman to start the board against the side face of the chosen guide bar, and as it is pushed toward the saw it is guided by this bar and passes beneath and raises the other bars between the selected one and the saw, these latter bars riding idly on the top surface of the board.

It is a further object of my invention to construct the guides so that they may be attached to the ordinary adjustable guiding fence or rail.

On the accompanying sheets of drawings I have illustrated the preferred and most desirable embodiment of my invention, and on the various views like reference characters are applied to the same parts throughout.

On these drawings,—Figure 1 is a perspective view of a portion of a band saw illustrating my multiple gage applied to the table; Fig. 2 is a plan view of the construction shown in Fig. 1; Fig. 3 is a side elevation of a part of the band saw equipped with my improved gage; Fig. 4 is a partial edge view and partial section of one of the gages; and Fig. 5 is a side elevation of the same.

In Fig. 1 I have illustrated the table 10 of a band saw adjacent to which is an upright column or post 11 on which a bracket or support 12 is vertically-adjustable, this bracket or support carrying a pair of feed rollers 13 and 14 and a guide-block 15 for a band saw 16. Extended across the table 10 is the usual guide fence or rail 17 adjustable toward and from the saw in any approved manner. Near its front end this angle guide fence is supplied with an upstanding slotted bracket 18 detachably carrying a shaft or bar 19 extended toward the saw. Resting on the top face of the table 10 and located between the saw and the fence 17 are a plurality of parallel guide bars or gages 19, 20, 21, 22, 23, and 24. All of these guide bars have their rear ends turned upwardly at 25 and a portion of them, in the present instance bars 19, 20, and 21, have their forward ends inclined upwardly at 26. The remaining bars 22, 23, and 24 lie flat upon the table as the bars 19, 20, and 21 do, but their front ends are not turned up. The forward end of each bar has a link 27 pivoted thereto at 28, each link consisting of a pair of side bars or plates 29 and 30 and an intermediate filler 31. The front ends of these links are all rotatably mounted on the shaft or rod 19, and each link is of the same thickness as the guide bar to which it is attached, so that the link forms a part of the gage or guide itself. As is clearly indicated, the front ends of the guide bars are arranged in stepped relation, that is, they project successively farther forward, the bar 24 being longest, while the bar 19 is the shortest. To allow for this difference in length of the bars, the links 27 also vary in length. All of these links extend rearwardly from the shaft or rod 19, which construction permits the guide bars and links to be readily raised when a board is pushed beneath them.

The operation of this mechanism is substantially as follows: The operator or workman places the end of the board to be sawed on the table 10 and presses one edge against the upturned end 26 of any one of the guide bars 19, 20 or 21, or against the side face of the link 27 connected to one of the bars 22, 23 or 24. The operator then pushes the board toward the saw, and, owing to the inclination of the forward ends of the bars and the links attached to other bars, the board readily passes beneath all of those guides or gages between the selected or chosen one and the saw, raising the same so that they ride idly upon the top face of the board, the latter being guided as it is fed to the saw by the rollers by the side face of the selected guide bar. As soon as the board has passed beyond these guide bars they all drop on to the face of the table into operative position again. It is to be understood that the bar which guides the boards and the other bars more remote from the saw remain resting on the face of the table. As is obvious, the guide bars between the selected one and the adjustable fence assist in holding the chosen guide bar from displacement or deflection while it is acting upon the board to properly guide its movement to the saw.

Although I have shown the group or set of guide bars as mounted on the adjustable fence, it is apparent that they may be otherwise supported, but by mounting them as shown and described they can be readily attached to saws of all kinds without any change or modification in the construction of the saw. They form, in reality, an auxiliary device which may be employed or not, and since the shaft or rod 19 may be readily detached or fastened to the bracket 18 the multiple gage may be applied to or removed from the machine with facility.

The workman, by employing this device, is enabled to saw boards of various widths without adjustment of the guide. As is well understood, where a single guiding fence or rail is used it is necessary to change its adjustment for each width of board to be sawed. This manual adjustment and manipulation of the guiding fence is wholly avoided by the employment of my improved multiple gage.

My invention is not limited and restricted to the exact structural features and arrangement of parts shown and described, but these may be varied to a considerable extent without departing from the heart and essence of my invention or sacrificing any of its benefits and advantages.

I claim:

1. In a device of the character described, the combination of a table, an adjustable fence or board guide on said table, and a multiple gage mounted on said fence or guide and consisting of a plurality of independently movable guide bars arranged side by side, above and adapted to move toward and from the table top whereby a board or the like fed to said bars may lift one or more thereof and be guided by the next unmoved bar, substantially as described.

2. In a device of the character described, the combination of a table, a support and a multiple gage mounted thereon, said gage consisting of a plurality of independently movable bars arranged side by side and a single link pivoted to each of said bars and rotatable on said support, whereby a board or the like fed on said table to said bars may displace one or more thereof and be guided by the next unmoved bar, substantially as described.

3. In a device of the character described, the combination of a table, a support, and a multiple gage above said table and mounted on said support, said gage consisting of a plurality of independently movable guiding bars arranged side by side and adapted to rest on said table and a link pivoted to each of said bars and rotatable on said support, whereby a board or the like fed to said bars may displace one or more thereof and be guided by the next unmoved bar, substantially as described.

4. In a device of the character described, the combination of a table, a support, and a multiple gage above said table consisting of a plurality of independently movable guiding bars arranged side by side and a single link pivoted to each of said bars and rotatably mounted on said support, said bars and links projecting successively farther forward, whereby a board or the like fed on said table to said bars may displace one or more thereof and be guided by the next unmoved bar, substantially as described.

5. In a device of the character described, the combination of a table, a support, and a multiple gage above said table consisting of a plurality of guiding bars arranged side by side and a single link pivoted to each of said bars and rotatable on said support, said bars and links extending successively farther forward and projecting rearwardly from said support, whereby a board or the like fed on said table to said bars may displace one or more thereof and be guided by the next unmoved bar, substantially as described.

GILBERT O. HAMMER.

Witnesses:
L. A. Ross,
D. F. Jones.